(12) United States Patent
Suzuki et al.

(10) Patent No.: US 7,137,133 B2
(45) Date of Patent: Nov. 14, 2006

(54) PICKUP DEVICE FOR OPTICAL DISK DRIVE

(75) Inventors: Jun Suzuki, Saitama-ken (JP); Eiji Kuroki, Saitama-ken (JP); Muneyuki Horiguchi, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 24 days.

(21) Appl. No.: 10/445,308

(22) Filed: May 27, 2003

(65) Prior Publication Data
US 2004/0013079 A1 Jan. 22, 2004

(30) Foreign Application Priority Data
May 27, 2002 (JP) .............................. 2002-152044

(51) Int. Cl.
*G11B 7/08* (2006.01)
(52) U.S. Cl. ..................................................... 720/683
(58) Field of Classification Search ................. 720/683
See application file for complete search history.

(56) References Cited

U.S. PATENT DOCUMENTS 5,165,088 A 11/1992 Suzuki et al.
5,566,149 A * 10/1996 Song .................... 369/44.15
5,886,978 A 3/1999 Matsui
6,018,509 A 1/2000 Itoh et al.
6,343,053 B1 1/2002 Akanuma et al.
2001/0026403 A1 10/2001 Suzuki

FOREIGN PATENT DOCUMENTS

| EP | 1 124 225 A2 | 8/2001 |
| JP | 8-221776 | 8/1996 |
| JP | 2001-229557 | 8/2001 |

* cited by examiner

*Primary Examiner*—David Davis
(74) *Attorney, Agent, or Firm*—Sughrue Mion, PLLC (57) ABSTRACT

The pickup device is used in a drive device of an optical disc and is opposed to the optical disc to irradiate a light beam from a light source onto an information recording surface of the optical disc. The pickup device has the actuator including the objective lens for condensing a light beam on the information recording surface of the optical disc, and irradiation of a light beam on the optical disc is controlled by moving the objective lens. Further, the pickup device has the optical system for directing a light beam, which is emitted from the light source, to a position below the objective lens. The optical system is placed at the same height level as the actuator. Therefore, as compared with the case where the optical system is provided below the actuator, the whole pickup can be smaller in thickness, and it is possible to provide a pickup device suitable for a thin drive device.

14 Claims, 9 Drawing Sheets

PICKUP DEVICE FOR OPTICAL DISK DRIVE

BACKGROUND OF THE INVENTION

1. Field of the Invention

The present invention relates to a pickup device of a disc drive for optically writing and reading information on an optical disc and, more particularly, to a pickup device suitable for a thin disc drive.

2. Description of Related Art

A disc drive for recording information on and reproducing information from an optical disc such as a CD (Compact Disc) and a DVD (Digital Video Disc) includes an optical pickup device. In order to accurately record and reproduce information on and from an optical disc, the pickup device performs a focus control for controlling a distance between an objective lens and an information recording surface of the optical disc and performs a tracking control for controlling the objective lens to follow an information track of the optical disc.

The pickup device directs a laser beam, which is emitted from a light source such as a laser diode, to the objective lens by using predetermined optical system components, and irradiates the laser beam onto the information recording surface of the optical disc via the objective lens. Normally, the objective lens is positioned to oppose to the optical disc. A laser beam from the light source is guided by the optical system components to a position below the objective lens along an optical path provided in parallel with the optical disc. Then, the laser beam is changed its path by a raise-up mirror placed under the objective lens to a vertical direction, that is, the direction of the objective lens, and the laser beam reaches the objective lens. The objective lens is mounted on a lens holder and coil substrates are mounted on the lens holder. The lens holder is moved vertically and horizontally with respect to the optical disc by applying driving current to the coil substrates in a magnetic field formed by the magnets which are placed close to each other, so that the focus control and the tracking control are performed. An example of such a pickup device is described in Japanese Patent Laid-Open under No. 2001-229557.

However, in the above-described pickup device, since the coil substrates are mounted on the opposing sides of the rectangular lens holder, the optical path of a laser beam from the laser light source cannot be arranged at the same height level as the coil substrates in the horizontal direction. Namely, since the paired coil substrates are positioned on both sides of the objective lens, the coil substrates become obstacles and prevent a laser beam from being guided to the position below the objective lens at the same height level as the coil substrates. For this reason, in the pickup device described in Japanese Patent Laid-Open under No. 2001-229557, for example, the optical path of a laser beam is placed below the lens holder. Namely, the optical path is arranged such that the laser beam is directed to the position below the objective lens at a lower level than the coil substrates and then directed to the objective lens by the raise-up mirror.

However, when the optical path of a laser beam is placed at a lower height level than the lens holder, the whole height (thickness in the vertical direction) of the pickup increases. For example, in a thin drive device such as a drive device mounted in a notebook-type personal computer, a thin pickup device has to be used and thus the above thick pickup device cannot be used.

SUMMARY OF THE INVENTION

The present invention is devised in view of the above-described point, and its object is to provide a thin pickup device suitable for use in a thin drive device.

According to one aspect of the present invention, there is provided a pickup device, including: an actuator including an objective lens; and an optical system for directing a light beam, emitted by a light source, to a position below the objective lens, wherein the optical system is placed at a same height level as the actuator, the actuator includes a lens holder for holding the objective lens and a pair of coil substrates mounted on sides of the lens holder so as to be partially opposed to each other, and the optical system extends to the position below the objective lens through a space in which the pair of coil substrates are not opposed to each other.

The above pickup device is used in a drive device and the like of an optical disc and is opposed to the optical disc to irradiate a light beam from a light source onto an information recording surface of the optical disc. The pickup device has the actuator including the objective lens for condensing a light beam on the information recording surface of the optical disc, and irradiation of a light beam on the optical disc is controlled by moving the objective lens. Further, the pickup device has the optical system for directing a light beam, which is emitted from the light source, to a position below the objective lens. The optical system is placed at the same height level as the actuator. Therefore, as compared with the case where the optical system is provided below the actuator, the whole pickup can be smaller in thickness, and it is possible to obtain a pickup device suitable for a thin drive device. Moreover, since the optical system is placed below the objective lens through the space in which the coil substrates are not opposed to each other, the coil substrates do not interfere with the arrangement of the optical system, thereby readily arranging the optical system at the same height level as the actuator.

The pair of coil substrates may be partially opposed to each other with being shifted by a predetermined distance to opposite directions in a tracking direction of an optical disc opposed to the objective lens. Hence, it is possible to place the optical system below the objective lens with maintaining the balance of the whole lens holder having the pair of coil substrates.

The actuator may include an actuator base having a pair of yokes, and a pair of magnets fixed on the pair of yokes, wherein each of the pair of magnets positioned to be opposed to each of the paired coil substrates. According to this feature, driving current is applied to the coils on the coil substrates in a magnetic field formed by the magnets, so that the objective lens is moved to perform focus control and tracking control.

The objective lens may be placed on the lens holder so as to be closer to the optical system than a center of gravity of the lens holder. When the objective lens is placed closer to the optical system in this manner, the arrangement of the optical system can reduce a shifting amount of the coil substrates mounted on the lens holder.

Each of the pair of the coil substrates may include a tracking coil and a focus coil formed in parallel along a horizontal direction of the coil substrate, and the pair of the coil substrates may be opposed to each other only on an area where the focus coil is formed. Thus, it is possible to form a proper magnetic field between the coil substrates and obtain a space for arranging the optical system.

The pair of the coil substrates may include a pair of bumps in the area where the focus coil is formed, and the lens holder may further include connecting wires for electrically connecting the bumps on the paired coil substrates. The bumps may be formed as conductive lands of the substrate. Hence, the coil substrates can be connected to each other via short connecting wires in an area having the opposed coil substrates.

Each of the pair of the magnets may have a magnetization pattern having a north pole area and a south pole area on both sides of a boundary area of substantially L-shaped. The boundary area may have a vertically extending area which intersects the tracking coil of the coil substrate in a vertical direction, and the boundary area may have a horizontally extending area which intersects the focus coil of the coil substrate in a horizontal direction. According to this embodiment, it is possible to accurately perform tracking control and focus control by applying driving current to the coils and a magnetic field formed by the magnets.

The pickup device may further include a plurality of suspension wires which are fixed on the actuator base and the coil substrates mounted on the lens holder and movably supports the lens holder and the coil substrate, wherein a plurality of positions at which the suspension wires are fixed on the actuator base have a horizontal distance smaller than that of a plurality of positions for fixing the suspension wires on the coil substrate. Hence, the suspension wires can be fixed on the coil substrates which are shifted and opposed to each other.

Further, a midpoint of a line connecting the positions at which the suspension wires are fixed on the coil substrate may coincide with a center of gravity of the lens holder. Thus, the lens holder can be supported by the suspension wires with preferred balance.

The nature, utility, and further features of this invention will be more clearly apparent from the following detailed description with respect to preferred embodiment of the invention when read in conjunction with the accompanying drawings briefly described below.

DETAILED DESCRIPTION OF THE PREFERRED EMBODIMENTS

The preferred embodiment of the present invention will now be described below with reference to the attached drawings.

Figure 1A:
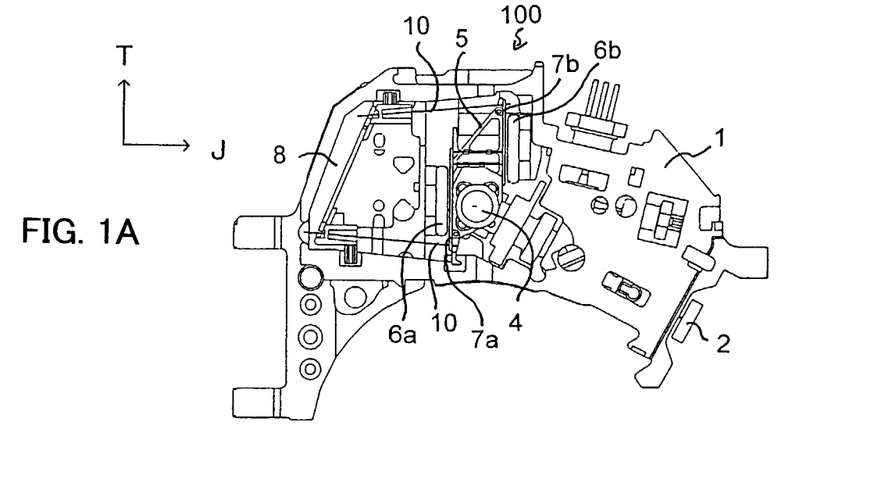
FIGS. 1A to 1C are diagrams showing the configuration of a pickup device according to the present invention.
Figure 1B:
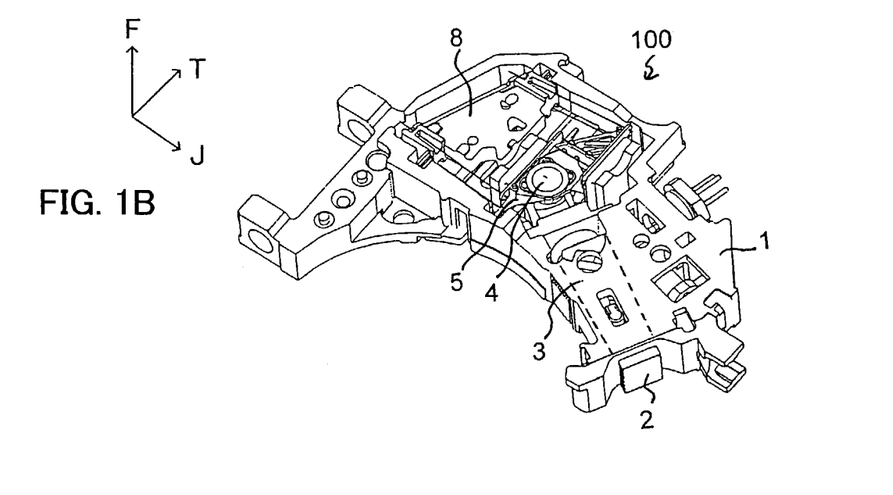
Figure 1C:
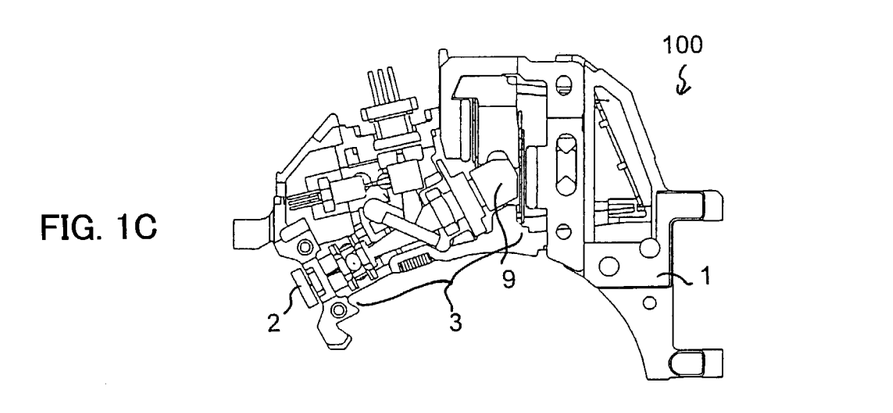

FIGS. 1A to 1C show the configuration of a pickup device according to an embodiment of the present invention. FIG. 1A is a top view of a pickup device 100, FIG. 1B is a perspective view of the pickup device 100, and FIG. 1C is a bottom plan view of the pickup device 100. As shown in FIGS. 1A to 1C, the pickup device 100 has various components mounted on a body 1. An actuator base 8 is fixed on the body 1, and the actuator base 8 supports a lens holder 5 movably in a focusing direction F and a tracking direction T by using four suspension wires 10. The lens holder 5 has coil substrates 7a and 7b mounted on the opposing sides thereof and an objective lens 4 mounted on the top surface.

Magnets 6a and 6b are fixed on the body 1 so as to be respectively opposed to the paired coil substrates 7a and 7b mounted on the lens holder 5. The paired magnets 6a and 6b are fixed so as to be opposed to each other, and a magnetic field is created in a space between the magnets 6a and 6b in accordance with the magnetization patterns of the magnets 6a and 6b. The lens holder 5 having the coil substrates 7a and 7b on the sides is placed in the magnetic field created by the paired magnets 6a and 6b. Thus, when a predetermined driving current is applied to a focus coil and a tracking coil that are formed on the coil substrates 7a and 7b, the lens holder 5 is moved in the focusing direction F and the tracking direction T due to force generated by the currents in the coils and the magnetic field. Due to the movement of the lens holder 5, the objective lens 4 on the lens holder 5 is moved to perform the focus control and the tracking control.

A laser light source 2 is mounted on an end of the body 1. A laser beam emitted from the laser light source 2 passes through an optical path 3, which is constituted by an optical system arranged in the body 1, and reaches the position below the objective lens 4. A raise-up mirror 9 is placed below the objective lens. The raise-up mirror 9 changes the path of the laser beam upward and the laser beam passes through the objective lens 4 upwardly from below. An optical disc is placed above the objective lens 4, and the objective lens 4 condenses the laser beam on the information recording surface of the optical disc.

Figure 2A:
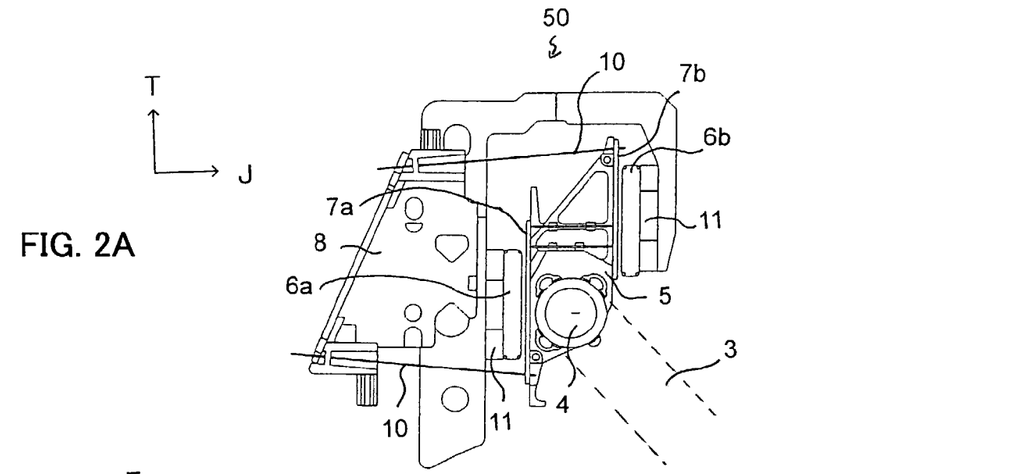
FIGS. 2A to 2C are diagrams showing the configuration of an actuator in the pickup device of the present invention.
Figure 2B:
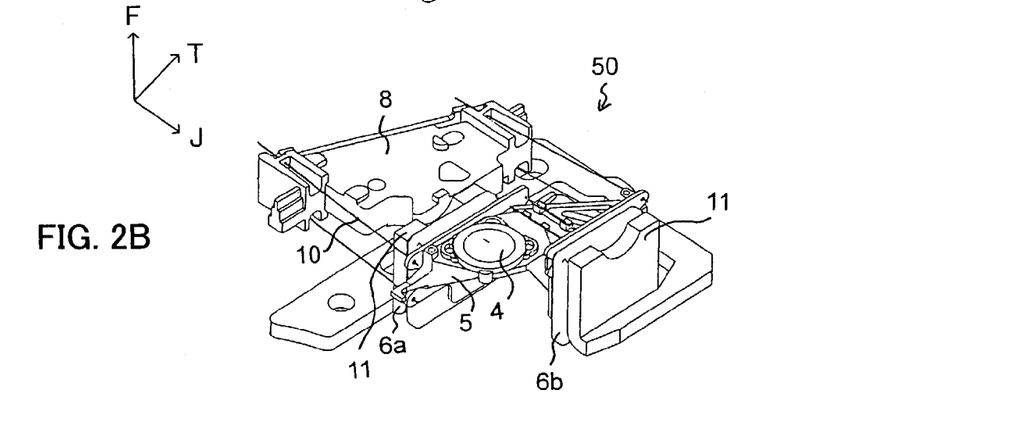
Figure 2C:
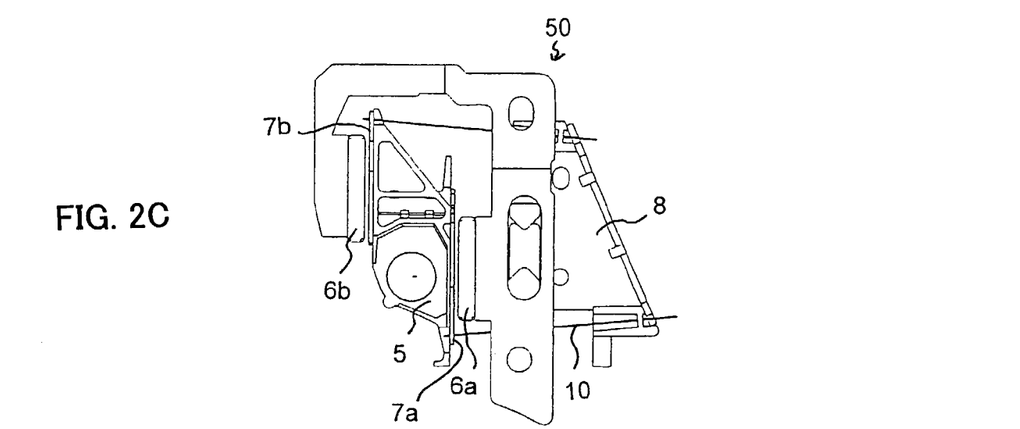

Next, referring to FIGS. 2A to 2C, an actuator of the pickup device 100 will be described below. FIG. 2A is a top view of the actuator, FIG. 2B is a perspective view of the actuator, and FIG. 2C is a bottom plan view of the actuator. The actuator 50 is a mechanism for moving the objective lens 4 in the focusing direction F and the tracking direction T, and includes the actuator base 8, the lens holder 5, the paired magnets 6a and 6b, and the paired coil substrates 7a and 7b mounted on the lens holder 5.

As shown in FIGS. 1A to 1C and 2A to 2C, the actuator base 8 is fixed on the body 1 of the pickup device 100. Further, a pair of yokes 11 is formed on the body 1, and the magnets 6a and 6b are fixed inside the yokes 11. In the pickup device 100 of the present invention, the paired yokes 11 are not completely opposed to each other but are displaced from each other in the tracking direction T. This arrangement is made to provide a space for arranging an optical path (optical system) 3 indicated by broken lines in FIG. 2A. The magnets 6a and 6b are mounted inside of the yokes 11, and hence a magnetic field is created in a space between the paired magnets 6a and 6b.

Meanwhile, on the actuator base 8, the lens holder 5 is supported by the four suspension wires 10. The lens holder 5 is supported by elasticity of the suspension wires 10 so as to be moved in the focusing direction F and the tracking direction T. The objective lens 4 is mounted on the lens holder 5. By applying driving current to the focus coil and the tracking coil on the coil substrates 7a and 7b, which are mounted on the lens holder 5, in a magnetic field created by the paired magnets 6a and 6b, force is applied to the coil substrates 7a and 7b as well as the lens holder 5 integrated with the coil substrates 7a and 7b in the focusing direction F and the tracking direction T, so that the objective lens 4 is moved with respect to the information recording surface and the information track of the optical disc.

As clearly shown in FIGS. 2A and 2B, in the pickup device 100 of the present invention, the paired coil substrates 7a and 7b are laterally (i.e., in the tracking direction T) shifted in the opposite directions and are not completely opposed to each other in a horizontal direction. This arrangement is made to place the optical path 3 from the laser light source 2 at the same height level as the magnets 6a and 6b and the coil substrates 7a and 7b.

In an ordinary pickup device, paired magnets and coil substrates are almost entirely opposed to each other in the width direction. Thus, the magnets and the coil substrates cover both sides of an objective lens like walls and a laser beam cannot be directed to the objective lens at the same height level. Hence, the optical path of the laser beam has to be placed at a lower height than the magnets and the coil substrates, thereby increasing the entire thickness of the pickup device.

On the contrary, in the actuator 50 of the present invention, the magnets 6a and 6b and the coil substrates 7a and 7b are displaced from each other oppositely in the tracking direction T. Namely, the paired magnets 6a and 6b are only partially opposed to each other, and the coil substrates 7a and 7b are only partially opposed to each other. Thus, as shown in FIGS. 2A and 2B, the objective lens 4 partially forms a space in the circumferential direction. The optical path 3 is placed in the space and a laser beam from the laser light source 2 is introduced to a position below the objective lens 4. With this configuration, it is possible to arrange the magnets 6a and 6b, the coil substrates 7a and 7b, and the optical path 3 of a laser beam from the laser light source 2 at the same height level, thereby reducing the entire height (thickness) of the pickup device.

Figure 3A:
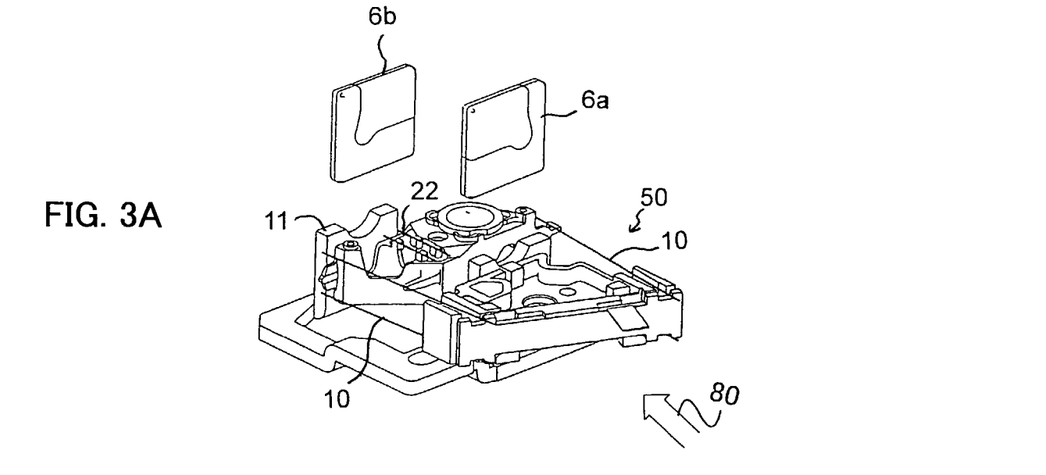
FIGS. 3A to 3C are diagrams showing the relative positions of coil substrates and magnets in the actuator.
Figure 3B:
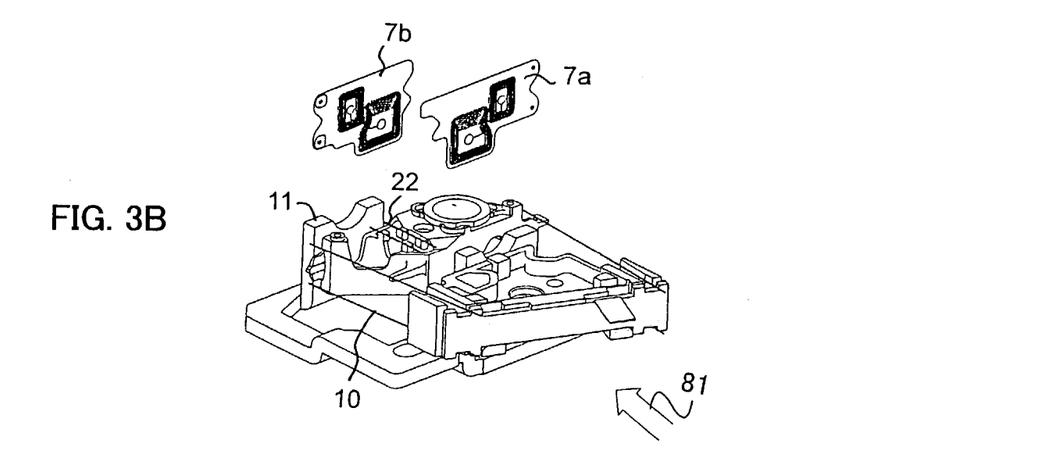
Figure 3C:
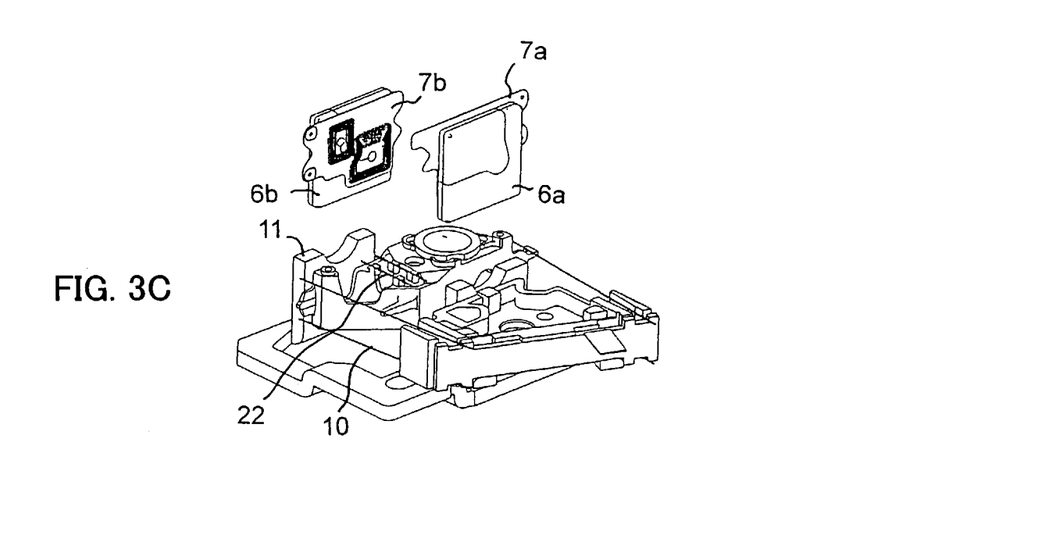

FIGS. 3A to 3C show the positional relation between the magnets and the coil substrates. FIG. 3A shows the arrangement of the magnets 6a and 6b with respect to the actuator 50, FIG. 3B shows the arrangement of the coil substrates 7a and 7b with respect to the actuator 50, and FIG. 3C shows the arrangement of the magnets 6a and 6b and the coil substrates 7a and 7b with respect to the actuator 50. Besides, FIGS. 3A to 3C show that the magnets and the coil substrates are removed upward from the mounting positions. Namely, in FIGS. 3A to 3C, the magnets and the coil substrates are moved from the illustrated positions in parallel to lower positions and are fixed thereon.

As shown in FIG. 3A, the magnets 6a and 6b are fixed inside the yokes 11 so as to be opposed to each other. Moreover, as shown in FIG. 3B, the coil substrates 7a and 7b are respectively mounted on the sides along the longitudinal direction of the lens holder 5. As already mentioned, the lens holder 5 is movably supported by the four suspension wires 10 in the space between the magnets 6a and 6b. As a result, as shown in FIG. 3C, the magnet 6a and the coil substrate 7a are positioned close to each other, and the magnet 6b and the coil substrate 7b are positioned close to each other.

Figure 4A:
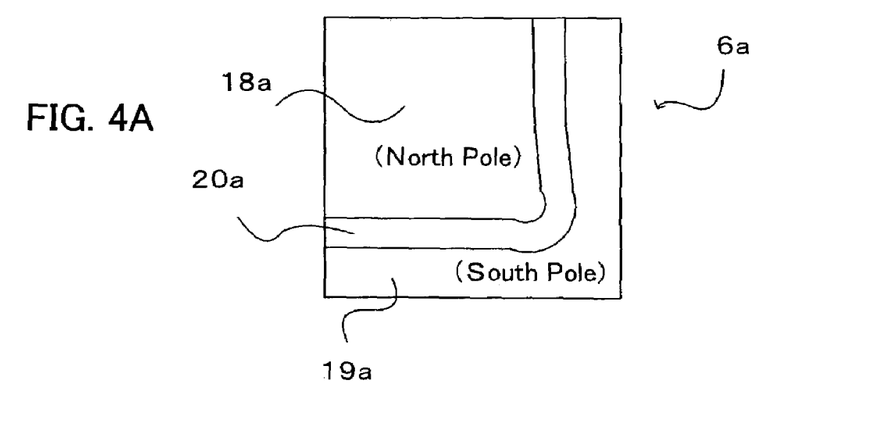
FIGS. 4A to 4C are diagrams showing a magnetization pattern of the magnets used for the actuator of the present invention.
Figure 4B:
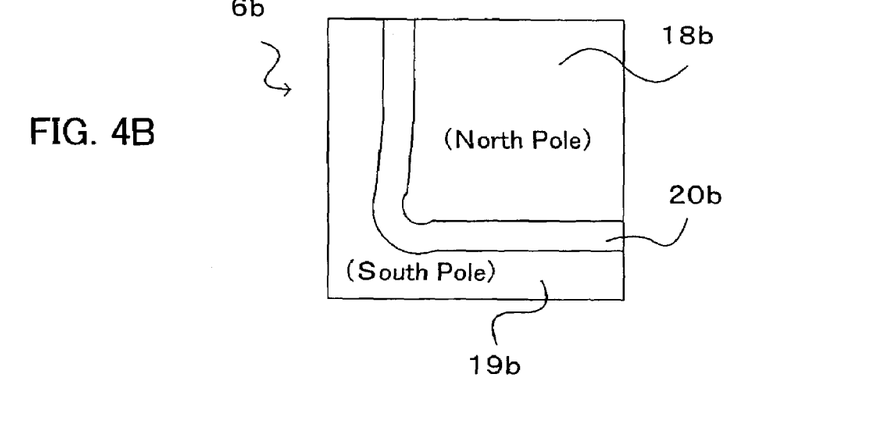

FIGS. 4A to 4C are plan views showing the magnets. FIG. 4A shows the magnet 6a, and FIG. 4B shows the magnet 6b. The magnets 6a and 6b are produced by magnetizing iron pieces of a predetermined size by using a magnetizing device. With the magnetizing device, illustrated magnetization patterns are formed on the magnets 6a and 6b. As shown in FIG. 4A, the magnet 6a has the magnetization pattern constituted by a magnetized area 18a of north pole, a magnetized area 19a of south pole, and a boundary area 20a between the areas 18a and 19a. Further, as shown in FIG. 4B, the magnet 6b has the magnetization pattern constituted by a magnetized area 18b of north pole, a magnetized area 19b of south pole, and a boundary area 20b between the areas 18b and 19b.

Figure 4C:
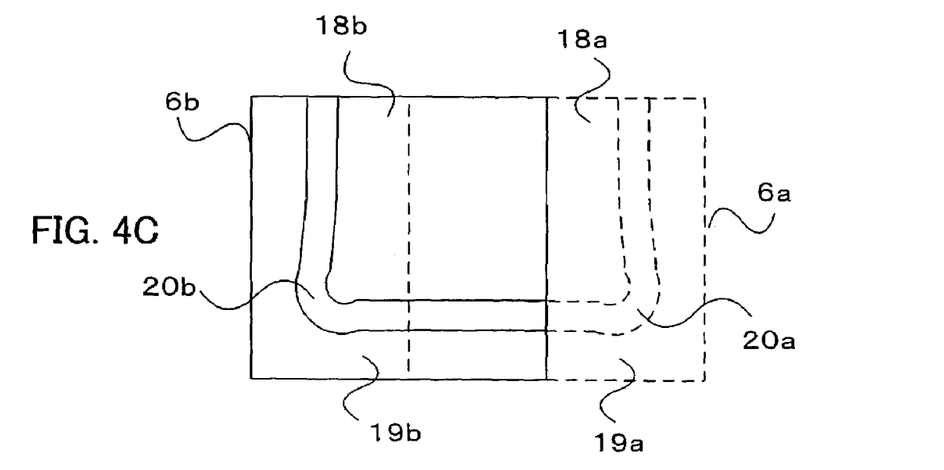

FIG. 4C shows the positional relation between the magnets 6a and 6b. As shown in FIG. 3A, the magnets 6a and 6b are fixed respectively on the yokes 11 so as to be opposed to each other. FIG. 4C shows the positional relation between the magnetization patterns of the magnets 6a and 6b in a state in which the magnets 6a and 6b are opposed to each other on the yokes 11. FIG. 4C shows the relative positional relation between the magnetization patterns of the magnets 6a and 6b, taken from the direction of an arrow 80 in FIG. 3A. The magnet 6a is indicated by broken lines and the magnet 6b is indicated by solid lines.

As shown in FIG. 4C, the magnets 6a and 6b are partially opposed to each other and partially has an overlap in the lateral direction when viewed from the direction of the arrow 80. At this point, in the perspective view taken from the direction of the arrow 80 in FIG. 3A, the north pole magnetized area 18a of the magnet 6a and the north pole magnetized area 18b of the magnet 6b overlap with each other, and the south pole magnetized area 19a of the magnet 6a and the south pole magnetized area 19b of the magnet 6b overlap with each other. In addition, the boundary area 20a of the magnet 6a and the boundary area 20b of the magnet 6b overlap with each other. As a result, a substantially recessed magnetic field, which corresponds to the magnetization pattern (hereinafter referred to as a "combined magnetization pattern") schematically shown in FIG. 4C, is formed in a space between the magnets 6a and 6b, that is, a space in which the lens holder 5 is placed.

Figure 5A:
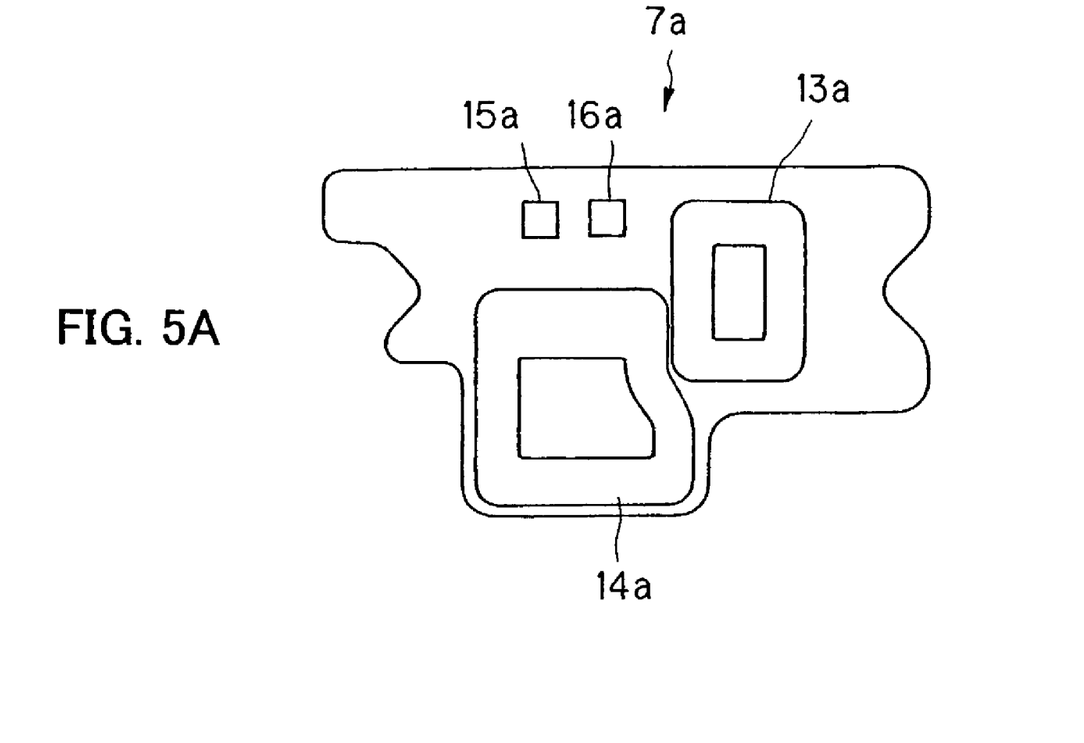
FIGS. 5A and 5B are diagrams showing the configuration of the coil substrates used for the actuator of the present invention.
Figure 5B:
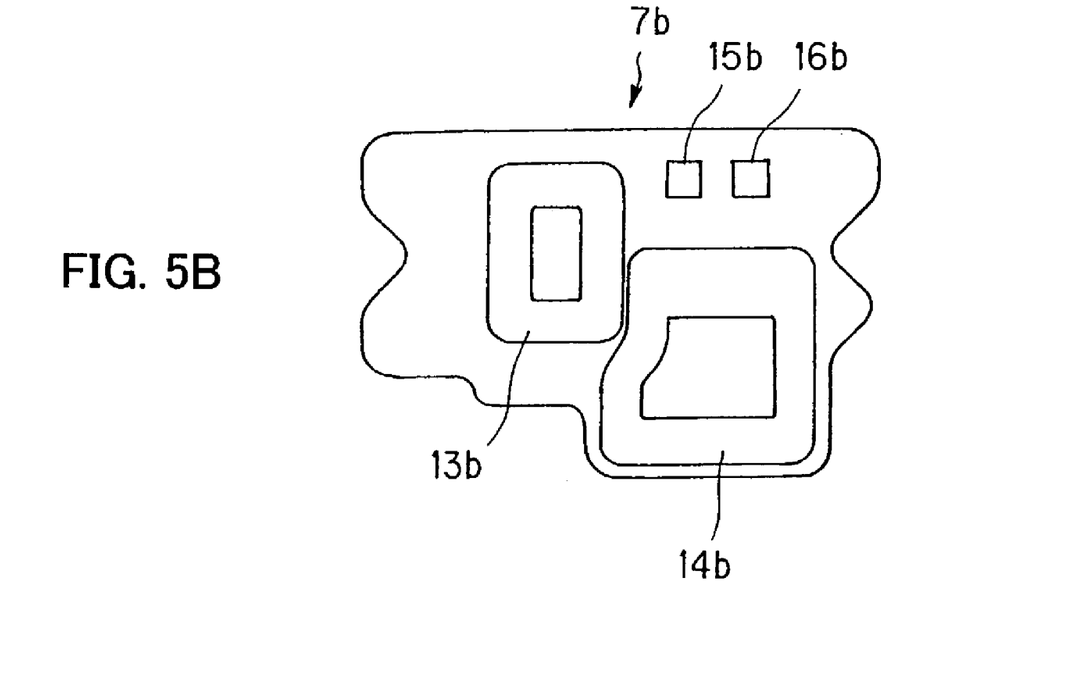

Next, the coil substrates will be described. FIG. 5A is a plan view of the coil substrate 7a, and FIG. 5B is a plan view of the coil substrate 7b. The coil substrate 7a is a printed wiring board and has a tracking coil 13a and a focus coil 14a formed on the substrate surface. Further, lands 15a and 16a are formed on the coil substrate 7a to establish continuity with the opposed coil substrate 7b.

Meanwhile, the coil substrate 7b is also a printed wiring board and has a tracking coil 13b and a focus coil 14b formed on the substrate surface. Moreover, lands 15b and 16b are formed on the coil substrate 7b to establish continuity with the opposed coil substrate 7a. In the state being mounted on the sides of the lens holder 5, the focus coil 14a of the coil substrate 7a and the focus coil 14b of the coil substrate 7b are substantially opposed to each other.

Figure 6A:
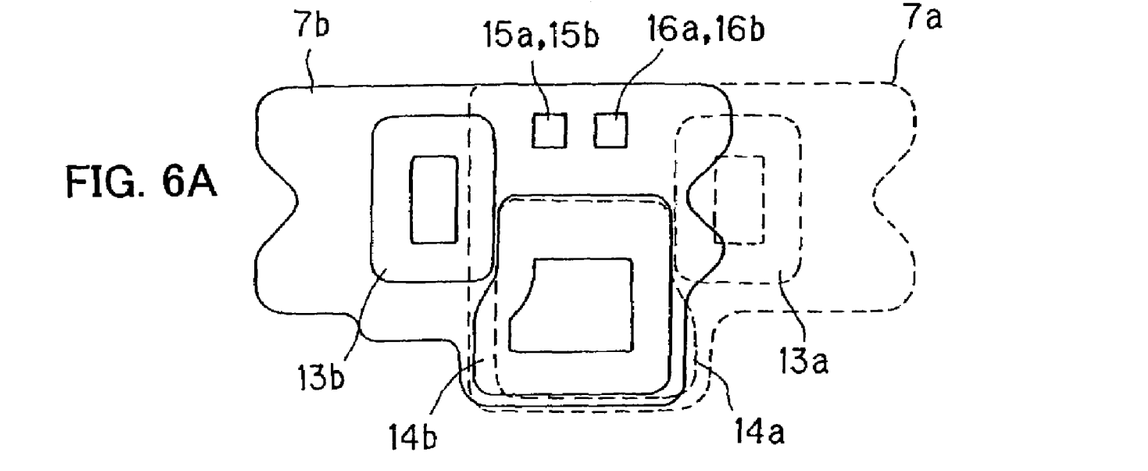
FIGS. 6A and 6B are diagrams showing the relative positional relation between the magnets and the coil substrates.

FIG. 6A shows the relative positional relation between the coil substrates 7a and 7b in a state being mounted on the lens holder 5. FIG. 6A perspectively shows the relative positional relation between the coil substrates 7a and 7b on the lens holder 5, viewed in the direction of the arrow 81 in FIG. 3B. The coil substrate 7a is indicated by broken lines and the coil substrate 7b is indicated by solid lines. As shown in FIG. 6A, the coil substrates 7a and 7b are mounted on the lens holder 5 with a such relative positional relation that the focus coils 14a and 14b are substantially overlap with each other, when viewed from the side of the lens holder 5. Further, in that state, the land 15a of the coil substrate 7a and the land 15b of the coil substrate 7b are opposed to each other, and the land 16a of the coil substrate 7a and the land 16b of the coil substrate 7b are opposed to each other. In a state in which the coil substrates 7a and 7b are mounted on the lens holder 5 in this manner, the opposed land 15a and 15b and the opposed land 16a and 16b are electrically connected via connecting wires 22 (see. FIGS. 3A to 3C). This electric connection applies driving current to the tracking coil 13b and the focus coil 14b of the coil substrate 7b.

Figure 6B:
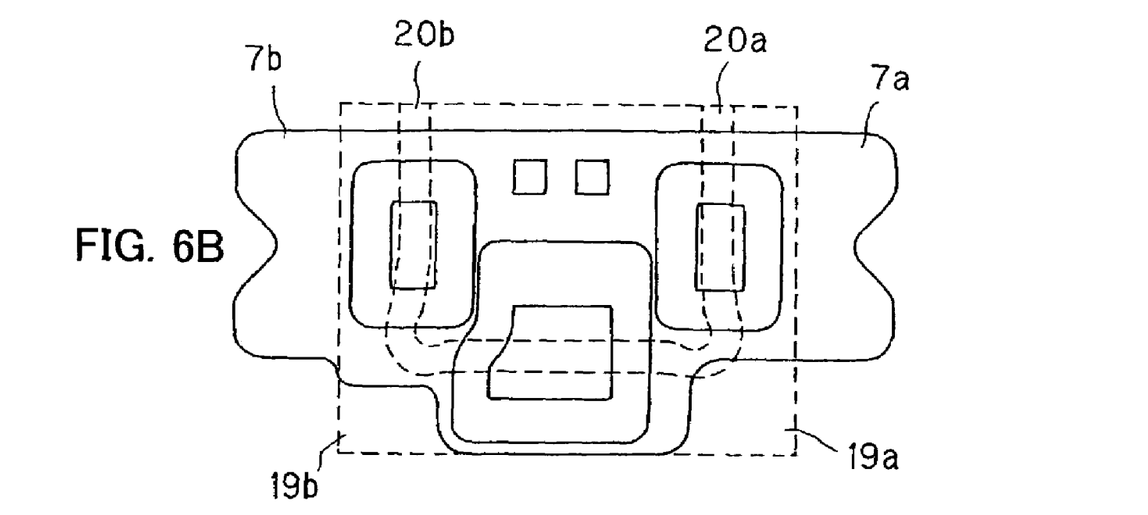

FIG. 6B shows a magnetic field created by the magnets 6a and 6b and the arrangement of the tracking coil and the focus coil in the magnetic field. As shown, the magnets 6a and 6b create a magnetic field corresponding to the combined magnetization pattern of a substantially recessed shape (indicated by broken lines) in FIG. 6B. The boundary area 20a of the magnet 6a shown in FIG. 4A longitudinally penetrates nearly the center of the rectangular tracking coil 13a of the coil substrate 7a shown in FIG. 5A. The boundary area 20b of the magnet 6b shown in FIG. 4B penetrates nearly the center of the rectangular tracking coil 13b of the coil substrate 7b shown in FIG. 5B. Further, the boundary areas 20a and 20b of the magnets 6a and 6b laterally penetrate nearly the center of the rectangular focus coils 14a and 14b of the coil substrates 7a and 7b. The lens holder 5 on which the coil substrates 7a and 7b are attached is placed in the space between the magnets 6a and 6b so as to establish such relative positional relations.

Next, the arrangement of the suspension wires 10 will be described. The suspension wire 10 is made from a linear metal having elasticity, and so on. In the actuator 50 of the present invention, the lens holder 5 is supported by the four suspension wires 10. As shown in FIGS. 1A and 3A, the ends of the four suspension wires 10 are fixed on the actuator base 8 and the other ends are fixed on the coil substrates 7a and 7b integrated with the lens holder 5. Thus, the lens holder 5 is placed in the space between the magnets 6a and 6b while being supported by the four suspension wires 10 in the horizontal direction. By the elasticity of the suspension wires 10, the lens holder 5 holding the objective lens 4 can move in the focusing direction F and the tracking direction T that are perpendicular to the longitudinal direction (jittering direction J) of the suspension wires 10.

Figure 7A:
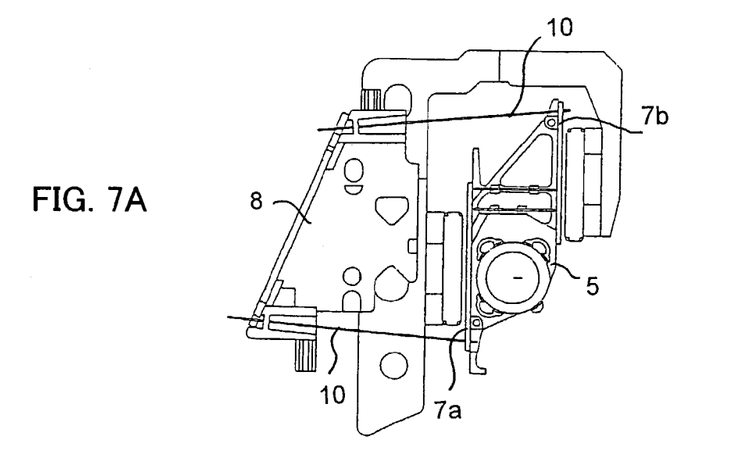
FIGS. 7A to 7C are diagrams showing the configuration of suspension wires used for the actuator of the present invention.

FIG. 7A shows the relative positional relationship between the actuator base 8, the suspension wires 10 and the lens holder 5. In the present invention, in order to place the optical path of the laser beam at the same vertical level as the coil substrate 7, the two opposed coil substrates 7a and 7b are mounted on the lens holder 5 with being shifted in the lateral direction (tracking direction T). Therefore, the suspension wires 10 are not in parallel with the jittering direction J. Namely, the suspension wires 10 are extended in a direction having a predetermined angle from the jittering direction J, and the ends of the suspension wires 10 are fixed on the actuator base 8.

Figure 7B:
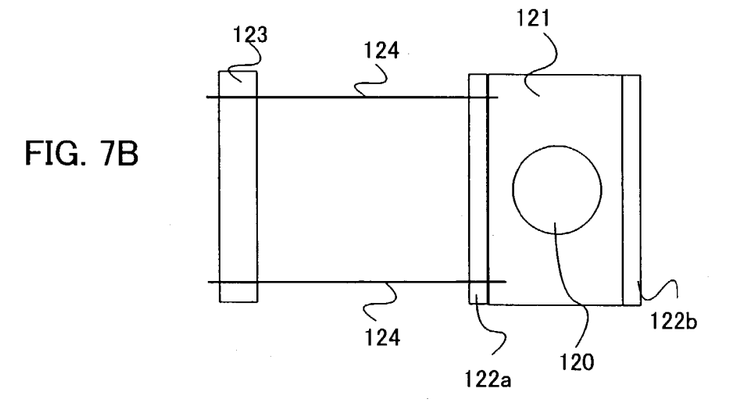
Figure 7C:
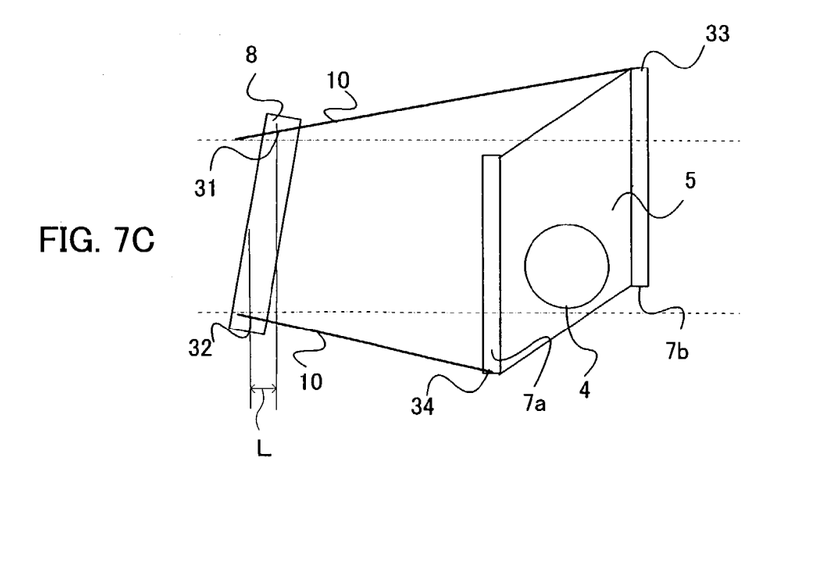

Referring to FIGS. 7B and 7C, the above configuration will be described in detail. FIG. 7B shows the relative positional relation between a typical actuator base, suspension wires and a lens holder. In FIG. 7B, a lens holder 121 is supported by four suspension wires 124 from an actuator base 123. It is to be noted that, since FIG. 7B is a plan view showing the top of the actuator, only the two upper suspension wires are shown. An objective lens 120 and a pair of coil substrates 122a and 122b are mounted on the lens holder 121. As shown in FIG. 7B, when the paired coil substrates 122a and 122b are placed on both sides of the lens holder 121 so as to be completely opposed to each other (namely, without the shift in the tracking direction T, unlike the present invention), the four suspension wires 10 fixed on the actuator base 8 and the lens holder 121 are arranged in parallel with each other.

On the other hand, FIG. 7C schematically shows the relative positional relation between the actuator base 8, the suspension wires 10 and the lens holder 5 in the actuator 50 of the present invention. In the case of the present invention, the coil substrates 7a and 7b are mounted on the sides of the lens holder 5 so as to be partially opposed to each other. Specifically, the coil substrate 7a is shifted downward in FIG. 7C and the coil substrate 7b is shifted upward in FIG. 7C to create the space for arranging the optical path 3.

Therefore, the suspension wires 10 are not in parallel with each other, but are somewhat opened to the direction of the lens holder 5. Specifically, as shown in FIG. 7C, each of the suspension wires 10 is extended to the lens holder 5 at an angle increased by an angle a from the direction of the lens holder 5 (that is, the jittering direction J), and the ends of the suspension wires 10 are fixed on the actuator base 8. Moreover, as is evident from comparison with FIG. 7B, the fixing positions 31 and 32 of the suspension wires 10 to the actuator base 8 are shifted by a distance L in the jittering direction J. Namely, a line connecting the fixing positions 31 and 32 of the suspension wires to the actuator base 8 is not arranged in parallel with the coil substrates 7a and 7b. The reason is as follows. Since the supporting positions of the suspension wires 10 on the side of the lens holder 5 are arranged at different levels with respect to the jittering direction J, when the supporting positions of the suspension wires 10 on the side of the actuator base 8 are not shifted in the jittering direction J, the four suspension wires 10 cannot have equal length, thereby breaking the relation between the center of gravity of the lens holder 5 and the spring constants of the four suspension wires 10. In order to prevent this problem, the supporting positions 31 and 32 of the suspension wires 10 on the side of the actuator base 8 are shifted in the jittering direction J and the four suspension wires are made equal in length.

Moreover, when suspension wires of equal lengths are used, the number of components can be reduced, thereby reducing the product cost. However, it is not always necessary to have suspension wires of equal lengths and various lengths are applicable. In that case, the configuration can be made by suitably setting spring constants and the like of the suspension wires.

Further, FIG. 7C only shows the two upper suspension wires 10 of the four suspension wires 10 in the focusing direction. The two lower suspension wires 10 are held below and in parallel with the two upper suspension wires 10.

In this way, in the actuator 50 of the present invention, the directions of the suspension wires 10 are not arranged in parallel but are somewhat opened to the lens holder 5. One of the reasons is that, since the width of the lens holder is increased in the tracking direction by shifting the position of the coil substrates, a spring interval (i.e., the interval between the supporting wires 10) on the side of the actuator is reduced to have a smaller projection area over the pickup. Another reason is that, by providing suspension wires not being in parallel, the spring constant of the suspension wires is increased in a twisting direction viewed from the arrow 81 of FIG. 3, so that a mode frequency (rolling frequency) in the twisting direction can be higher than a parallel spring.

Further, the fixing positions 31 and 32 of the suspension wires 10 on the side of the actuator base 8 are shifted in the jittering direction J.

Figure 8A:
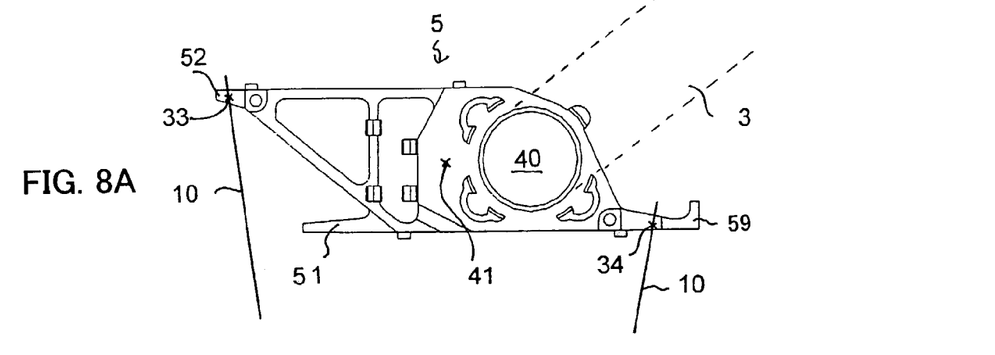
FIGS. 8A to 8D are diagrams showing the configuration of a lens holder used for the actuator of the present invention.
Figure 8B:
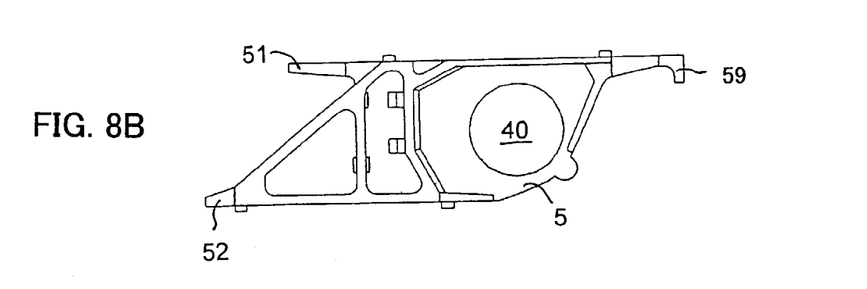
Figure 8C:
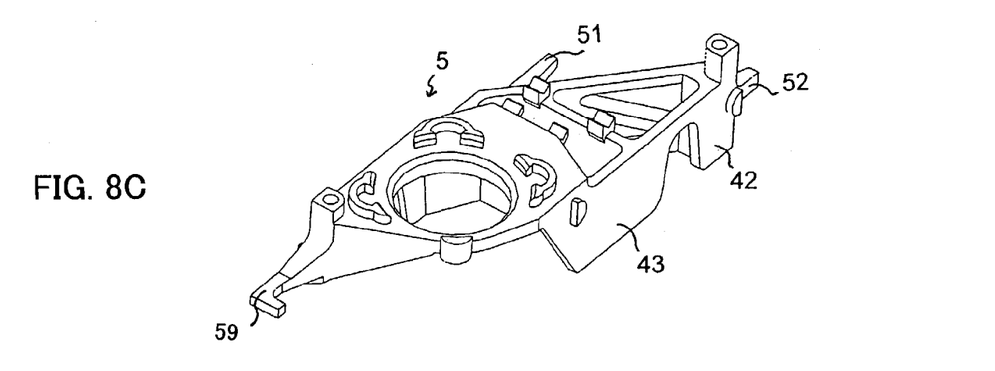
Figure 8D:
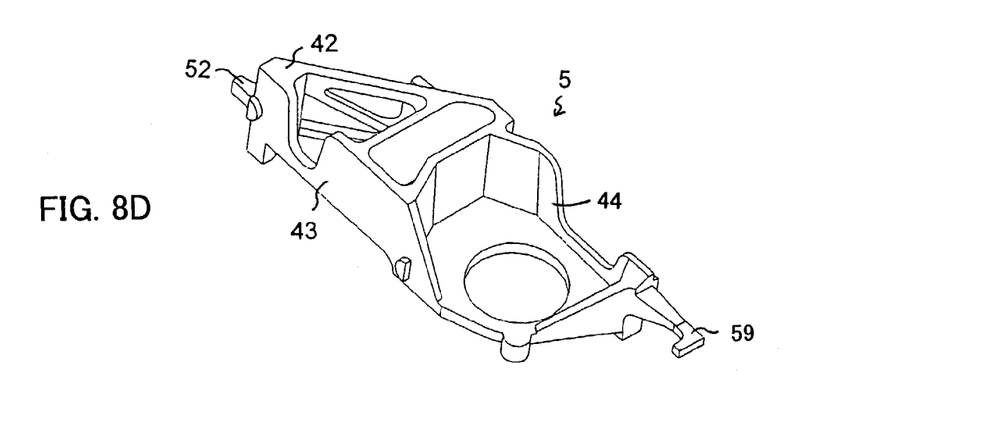

Next, the lens holder will be described below. FIGS. 8A to 8D show the configuration of the lens holder 5. FIG. 8A is a top view of the lens holder 5, FIG. 8B is a bottom plan view of the lens holder 5, FIG. 8C is a perspective view of the lens holder 5 obliquely viewed from above, and FIG. 8D is a perspective view of the lens holder 5 obliquely viewed from below.

As shown in FIGS. 8A to 8D, the lens holder 5 has a mounting hole 40 for mounting the objective lens 4. The mounting hole 40 is shifted from a gravity center 41 of the lens holder 5 to the side of the optical path 3. The objective lens is normally placed around the center of the lens holder (around the center of gravity of the lens holder, see FIG. 7B). However, in the present invention, the pickup 50 is configured so that the coil substrates 7a and 7b mounted on the lens holder 5 are shifted in the tracking direction T to obtain the optical path for directing a laser beam to below the objective lens. Thus, the position mounting the objective lens on the lens holder 5 is shifted to the optical path 3 of the laser beam. Since the optical path 3 of a laser beam has to reach below the objective lens 4, when the objective lens 4 is positioned around the center of the lens holder 5, the optical path 3 of the laser beam has to reach around center of the lens holder 5. Accordingly, the coil substrate 7b on the side of the optical path 3 should be shifted more largely to obtain a larger space on the side of the lens holder 5. On the contrary, as shown in FIG. 8A, when the position of the objective lens 4 (that is, the position of the mounting hole 40) is shifted to the optical path 3, the optical path 3 is placed closer to the end of the lens holder 5, thereby reducing a shifting amount of the coil substrate 7b on the side of the optical path 3. Hence, it is possible to reduce the length of the lens holder 5.

Moreover, when the mounting position of the objective lens 4 on the lens holder 5 is shifted in the direction of the optical path 3, the center of gravity of the lens holder 5 itself is shifted to the optical path 3 side after mounting the objective lens 4. Therefore, as shown in FIGS. 8C and 8D, the configuration of the lens holder 5 is devised as follows. Namely, the wall parts 42 and 43 on the opposite side of the objective lens 40 of the lens holder 5 are formed with a larger thickness than a part 44 on the side of the objective lens mounting hole 40, for example, and the center of gravity of the lens holder 5 is positioned substantially at the center when the objective lens 4 is mounted on the lens holder 5. In this way, the shift of the center of gravity of the lens holder, that may happen by shifting the position of the objective lens in the direction of the optical path, is cancelled.

Further, as shown in FIG. 8A, the fixing positions 33 and 34 of the suspension wires 10 to the lens holder 5 have a midpoint substantially coinciding with the gravity center 41 of the lens holder 5 supported by the suspension wires 10. Namely, in FIG. 8A, the suspension wires 10 are each fixed on the lens holder 5 (to be precise, the coil substrates 7b and 7a mounted on the lens holder 5) at the fixing positions 33 and 34. In this case, the midpoint of the fixing positions 33 and 34 substantially coincide with the gravity center 41 of the lens holder 5. As a result, both ends of the lens holder 5 can be held by the suspension wires 10 with being equally balanced, thereby preventing rolling and the like of the lens holder 5.

Further, as shown in FIGS. 8A to 8D, the lens holder 5 includes stoppers 59, 51 and 52. The stoppers 59, 51 and 52 play a role of limiting the stroke (movable range) of the lens holder 5 in the focusing direction F and the tracking direction T. Thus, when a focus servo or a tracking servo causes a malfunction, it is possible to prevent the lens holder 5 from moving unlimitedly, making contact with the body 1 and the other members, and damaging the lens holder 5, the objective lens 4 and so on.

In the lens holder 5 of the present invention, the stopper 59 has both functions of a stopper in the focusing direction F and a stopper in the tracking direction T. Namely, the movement of the lens holder 5 in the focusing direction F is limited by the stoppers 59 and 51, and the movement of the lens holder 5 in the tracking direction T is limited by the stoppers 59 and 52.

Figure 9A:
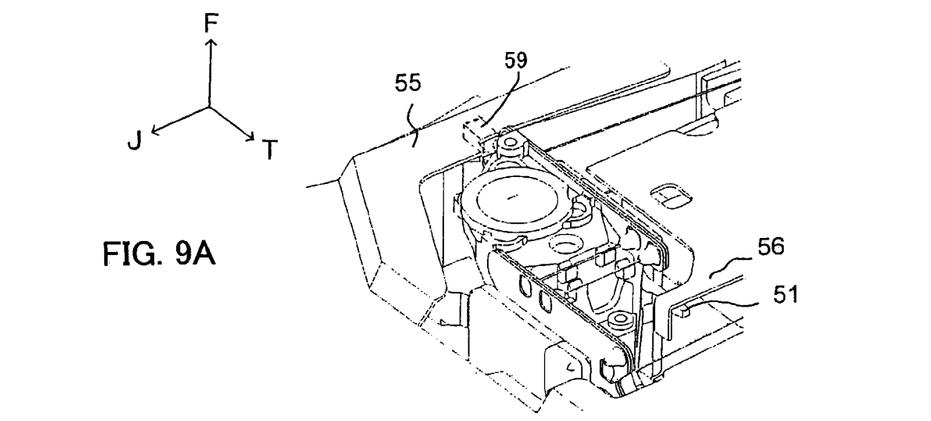
FIGS. 9A to 9C are diagrams showing stroke limitation performed by stoppers formed on the lens holder.

FIG. 9A shows a state in which the stroke is limited in the focusing direction F by the stoppers 59 and 51. The stopper 59 (indicated by broken lines) makes contact with a cover 55 of the body 1 from below and the stopper 51 similarly makes contact with a cover 56 of the body 1 from below, thereby limiting the movement of the lens holder 5 in the focusing direction F (i.e., the upward direction in FIG. 9A).

Figure 9B:
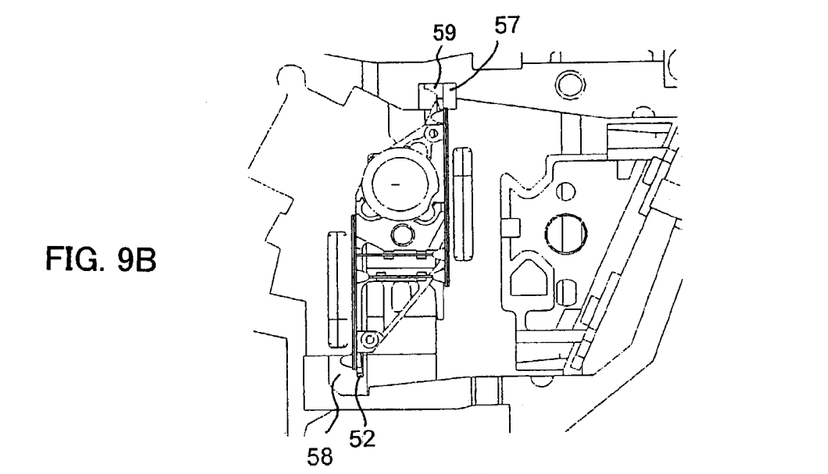
Figure 9C:
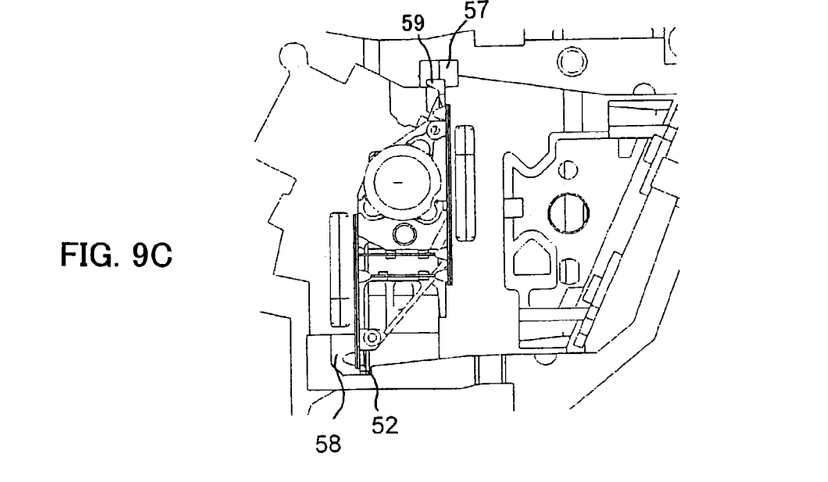

FIGS. 9B and 9C show that the stroke is limited in the tracking direction T by the stoppers 59 and 52. In FIG. 9B, the stopper 59 makes contact with the side wall of a recessed part 57 provided on the body 1. In FIG. 9C, the stopper 52 makes contact with the side wall of a recessed part 58 provided on the body 1. Thus, the moving range of the lens holder 5 is limited in the tracking direction T.

As described above, in the lens holder 5 of the present invention, the position of the objective lens 4 is shifted in the direction of the optical path 3. In addition, as well shown in FIG. 8D, the portion of the lens holder 5 on the side of the mounting hole 40 of the objective lens has a relatively small thickness and the portion of the lens holder 5 on the opposite side to the mounting hole 40 has a relatively large thickness to adjust the center of gravity of the lens holder 5. Moreover, it is desirable to minimize the number of members provided in the direction of the optical path 3 around the mounting hole 40 so as not to interrupt the optical path of a laser beam reaching below the objective lens 4 from the laser light source 2. For these reasons, the stopper 59 has stroke limiting functions both in the focusing direction F and the tracking direction T.

As described above, according to the actuator of the present invention, the pair of coil substrates mounted on the lens holder is shifted in the longitudinal direction (tracking direction T) of the lens holder to obtain the optical path for directing a laser beam to the position below the objective lens. Thus, it is possible to direct a laser beam to the position below the objective lens at the same height level as the coil substrates and the magnets, thereby reducing the thickness of the whole actuator.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No. 2002-152044 filed on May 27, 2002 including the specification, claims, drawings and summary is incorporated herein by reference in its entirety.

What is claimed is:

1. A pickup device, comprising:
an actuator including an objective lens, a lens holder for holding the objective lens and a pair of coil substrates mounted on sides of the lens holder; and
an optical system including a raise-up mirror, positioned below the objective lens, and a light source, the optical system creating a first optical path of a light beam from the light source to the raise-up mirror and a second optical path of a light beam from the raise-up mirror to the objective lens,
wherein the first optical path runs at a same height level as the coil substrates,
wherein the pair of coil substrates are mounted so as to be partially opposed to each other by being relatively shifted by a predetermined distance to opposite directions in a tracking direction of an optical disc opposed to the objective lens, and
wherein the first optical path extends to the raise-up mirror through a space created by the shifted coil substrates in which the pair of coil substrates are not opposed to each other.

2. The pickup device according to claim 1, wherein the actuator comprises:
an actuator base having a pair of yokes,
and a pair of magnets fixed on the pair of yokes, wherein each of the pair of magnets positioned to be opposed to each of the paired coil substrates.

3. The pickup device according to claim 2, wherein
each of the pair of the magnets has a magnetization pattern having a north pole area and a south pole area on both sides of a boundary area of substantially L-shaped,
the boundary area has a vertically extending area which intersects the tracking coil of the coil substrate in a vertical direction, and
the boundary area has a horizontally extending area which intersects the focus coil of the coil substrate in a horizontal direction.

4. The pickup device according to claim 1, wherein the objective lens is placed on the lens holder so as to be closer to the optical system than a center of gravity of the lens holder.

5. The pickup device according to claim 1, wherein
each of the pair of the coil substrates comprises a tracking coil and a focus coil formed in parallel along a horizontal direction of the coil substrate, and
the pair of the coil substrates are opposed to each other only on an area where the focus coil is formed.

6. The pickup device according to claim 5, wherein
the pair of the coil substrates comprise a pair of bumps in the area where the focus coil is formed, and
the lens holder further comprises connecting wires for electrically connecting the bumps on the pair of the coil substrates.

7. The pickup device according to claim 1, further comprising a plurality of suspension wires which are fixed on the actuator base and the coil substrates mounted on the lens holder and movably supports the lens holder and the coil substrate,
wherein a plurality of positions at which the suspension wires are fixed on the actuator base have a horizontal distance smaller than that of a plurality of positions at which the suspension wires are fixed on the coil substrate.

8. The pickup device according to claim 7, wherein a midpoint of a line connecting the positions at which the suspension wires are fixed on the coil substrate coincide with a center of gravity of the lens holder.

9. The pickup device according to claim 1, wherein the tracking direction is perpendicular to a direction in which the pair of substrates are opposed to each other and a direction in which the light beam is emitted from the objective lens.

10. The pickup device according to claim 1, wherein the first optical path passes though a space between edges of the pair of coil substrates relatively shifted, each of the edges extending in a direction perpendicular to the tracking direction.

11. The pickup device according to claim 1, wherein the raise-up mirror and the light source are positioned at the same height level as the coil substrate.

12. The pickup device according to claim 1, wherein the first optical path runs perpendicularly to the second optical path.

13. A pickup device, comprising:
an actuator including
an objective lens,
a lens holder for holding the objective lens and tracking coils mounted on sides of the lens holder; and
an optical system including a raise-up mirror positioned below the objective lens, and a light source, the optical system creating a first optical path of a light beam from the light source to the raise-up mirror and a second optical path of a light beam from the raise-up mirror to the objective lens;
wherein the first optical path runs as a same height level as the tracking coils;
wherein the tracking coils are mounted in a manner being shifted relatively to each other in a tracking direction of an optical disc opposed to the objective lens, thereby to create a space between the tracking coils;
wherein the first optical path extends to the raise-up mirror through the space.

14. A pickup device, comprising:
a lens holder;
a first tracking coil positioned along a first side of the lens holder and a second tracking coil positioned along a second side of the lens holder, the first and second sides of the lens holder being parallel to a tracking direction; and
an optical system including a raise-up mirror positioned below the lens holder, and a light source, the optical system creating a first optical path of a light beam from the light source to the raise-up mirror;
wherein the first tracking coil and the second tracking coil are shifted relatively to each other in the tracking direction, thereby to create a space at one of the sides of the lens holder; and
wherein the first optical path extends to the raise-up mirror through the space.

* * * * *